Nov. 25, 1969  J. F. DILLON, JR., ET AL  3,480,409
METHOD OF GROWING $CdCr_2Se_4$ CRYSTALS
Filed Oct. 3, 1966
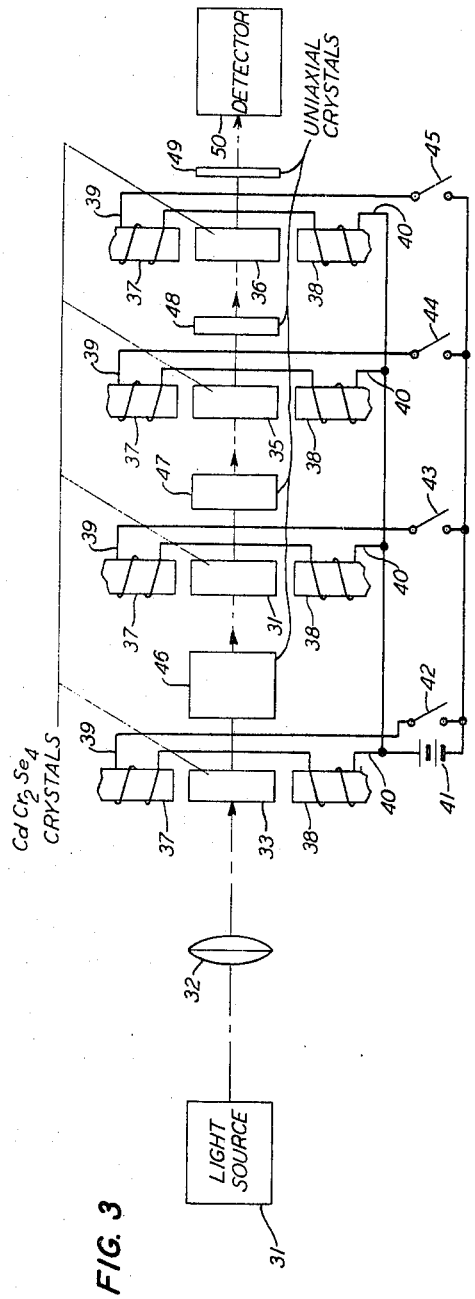
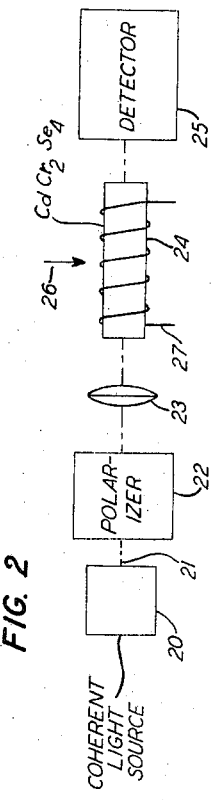
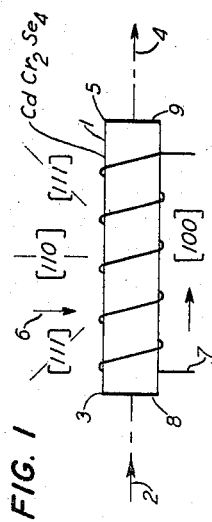
INVENTORS: J. F. DILLON JR.
ROY CONWAY LE CRAW
H. VON PHILIPSBORN
J. H. WERNICK
BY George S. Indig
ATTORNEY

3,480,409
METHOD OF GROWING CdCr$_2$Se$_4$ CRYSTALS

Joseph F. Dillon, Jr., Morristown, Roy Conway Le Craw, Madison, Henning von Philipsborn, Berkeley Heights, and Jack H. Wernick, Madison, N.J., assignors to Bell Telephone Laboratories, Incorporated, Berkeley Heights, N.J., a corporation of New York
Filed Oct. 3, 1966, Ser. No. 583,811
Int. Cl. C01b *19/00;* C01g *11/00, 37/00*
U.S. Cl. 23—315         2 Claims

ABSTRACT OF THE DISCLOSURE

The magnetic chalkogenide CdCr$_2$Se$_4$ is produced by crystallization within a liquid phase formed between the contacting initial ingredients CrCl$_3$ and CdSe by heating to a temperature of about 700° C.

---

This invention relates to a flux-growing technique for the crystalline composition CdCr$_2$Se$_4$, to crystals grown by such technique, and to devices and systems employing such crystals. The crystals of this invention, since they are ferromagnetic, permit magnetic modulation in a class of devices. So, for example, an exemplary use involves magneto-optic modulation, as in infrared communications systems.

It is unnecessary to comment in detail on the scientific and engineering activity that followed the announcement of the laser a few years ago. To the research scientists this new coherent light source was a valuable analytical tool. To the physicist it was a new key which would unfold more of the mysteries of fundamental matter. To the engineer it was a very fine, controllable energy source suitable for detailed fabrication and other localized procedures. These uses and others have been realized.

From a practical standpoint, one of the more promising large-scale applications of the laser is in the communications field. Here, the use of carrier frequencies orders of magnitude higher than any now commonly in use promises a corresponding increase in bandwidth. The past several years have seen an enormous research and engineering effort directed not just to the laser source itself, but to the associated modulators, isolators, detectors, and other elements required for an operating system.

While it is by no means certain that the ultimate laser communications system will utilize a solid-state laser, this type of source has much to recommend it. Desirable characteristics include small size, physical and chemical durability, and reasonable operating efficiency.

The best solid-state laser sources utilize crystalline host materials containing small doping levels, usually of rare-earth ions. For continuous rather than pulse operation, emission is generally at infrared frequencies. For this reason, communications engineers interested in the design of a solid-state laser system are interested in modulator materials that transmit in the infrared.

In accordance with this invention the ferromagnetic composition CdCr$_2$Se$_4$ described in 15 Physical Review Letters 493 (1965), however, when grown by a particular novel growth technique, is found to have appropriate properties for use in devices such as magneto-optic modulators operating at frequencies including the infrared. Ferromagnetic resonance line widths of from an oersted to a small fraction of an oersted have been measured at temperatures up to 110° K. and above. Saturation magnetizations (4$\pi$M) range from 1000 gauss to 1600 gauss over the temperature range from 110° K. to that of atmospheric liquid nitrogen. Resonance frequencies are of the order of 10 gigahertz at saturation. In accordance with one of the examples, typical operating parameters for a rod-shaped modulator may include application of a D.C. field of about 600 oersteds or less, a modulating power of the order of one-half watt, and a bandwidth of the order of several hundred megacycles, using a rod of the order of one centimeter in length at a temperature of about 100° K.

This invention is also concerned with the growth technique resulting in the excellent crystals necessary to the inventive devices as well as with the crystalline product itself. This technique is a flux method utilizing CrCl$_3$ as a starting ingredient. Use of other initial ingredients includng other halides has not resulted in crystals showing the properties upon which this invention is premised.

Reference is had to the drawing, in which:

FIG. 1 is a front elevational view of a CdCr$_2$Se$_4$ magneto-optic element in accordance with the invention;

FIG. 2 is a diagrammatic representation of a communications system utilizing an element such as that depicted in FIG. 1; and FIG. 3 is a diagrammatic representation of a digital light deflector utilizing the crystalline material herein.

Referring again to FIG. 1, the element shown consists of crystalline body 1 of CdCr$_2$Se$_4$. Provision is made for introduction of light beam 2 at surface 3 and for extraction of light beam 4 at surface 5. This material is a spinel, and the crystalline directions indicated in the figure are useful for modulator operation. In accordance with the figure, orientation is such that light transmission is along a [100] crystallographic direction. A direction normal to light transmission, illustratively in the plane of the representation, defines a [110] crystallographic direction. Magnetic means, not shown, is provided for magnetically saturating crystalline body 1. Arrow 6 is intended to depict at least a component of this applied field. Modulation is achieved by introducing a magnetic field component in the light transmission direction. This may be accomplished by passing a current through winding 7 from a source not shown.

The orientations shown in FIG. 1 are exemplary only. The anisotropy fields in CdCr$_2$Se$_4$ are low, so that orientation of the crystal in such manner as to result in a light transmission direction corresponding with a [111] crystalline direction is essentially equivalent.

Operation of the device of FIG. 1 is well understood. Briefly, body 1 is magnetically saturated, in this instance by normal magnetic field 6. The field may exceed the saturation valve to permit operation at higher frequencies in the usual manner. A plane polarized light beam 2 polarized parallel to or perpendicular to field 6, introduced at surface 3, passes through body 1 unchanged. Introduction of current through winding 7 tilts the magnetization, so resulting in a component in the light transmission direction. The magnitude of this component determines the degree of rotation or of phase retardation or a frequency change depending upon the system. Regardless of the mode of operation, the degree of modulation may be enhanced by use of optional partially reflecting surfaces 8 and 9. The resulting cavity permits retention of the light beam for a given number of passes, during each of which the degree of modulation is increased.

The system of FIG. 2 consists of laser oscillator 20 producing light beam 21, which passes through polarizer 22, focusing means 23, CdCr$_2$Se$_4$ modulator 24, and finally into detector 25, in succession. An applied field 26 having a component normal to the light transmission direction maintains body 24 magnetically saturated. Modulating current introduced through winding 27 results in relative retardation of one sense of circularly polarized light of a degree dependent upon the magnitude of the component of magnetization lying in the transmission direction.

The system of FIG. 2 may be operated in several ways. For example, if polarizer 22 results in plane polarization, detector 25 may include an analyzer which is crossed, parallel, or at some intermediate angle with respect to the polarizer. The magnitude of the magnetization component parallel to the transmission direction produces an accompanying rotation of the plane of polarization, resulting in a concomitant variation in amplitude of transmitted light detected at element 25. Polarizer 22 may be a quarter wavelength plate of a birefringent material which produces circular polarization. Tilting the magnetization now results only in a retardation or acceleration of the beam, which may be sensed as a phase shift or frequency change in detector 25.

The device depicted in FIG. 3 is a digital light deflector. Many different light deflector arrangements have been proposed, but all of them have the same general principle of operation. In general, the light beam entering any of a number of succeeding units may leave the unit in either of two positions or directions. The exiting condition is generally dependent upon the resolved plane of polarization which, in turn, is dependent upon the presence of or magnitude of an applied field. In the device depicted, a plane polarized beam introduced into a crystal of $CdCr_2Se_4$ polarized at an angle of 45° relative to an applied magnetic field direction is, in effect, rotated by increasing or decreasing the refractive index in the plane of the applied field relative to the orthogonal direction. If the $CdCr_2Se_4$ crystalline length in the light transmission direction is appropriately chosen, the plane of polarization of the light beam may be "rotated," for example 90°. Introduction of the exiting beam into a properly oriented uniaxial material or into a Wallaston prism may in this case then result in either of two distinctly different positions or directions of the beam.

The device depicted in FIG. 3 includes a polarized light source 31, a lens 32, $CdCr_2Se_4$ rotation elements 33, 34, 35 and 36, each having associated electromagnetic pole pieces 37 and 38, windings of which terminate in leads 39 and 40, respectively. Leads 39 and 40 are attached to biasing source 41 through switches 42, 43, 44, and 45. Following each of crystals 33 through 36 in the light transmission direction are uniaxial crystals 46, 47, 48, and 49, each succeeding member being half the thickness of the one preceding. The final element in the circuit shown is detector 40.

Cadmium chromium selenide is a cubic material, and as such shows no birefringence in the absence of a magnetic field. While there is certainly domain structure in the operating temperature range, there are so many domains in the light transmission direction that their average effect is small. The device of FIG. 3 may take advantage of this fact and provide for field for only one of the two corresponding digital positions of each of the rotating elements.

The device shown depends for its operation on the ability of a uniaxial material to displace polarized light having a polarization direction other than parallel or normal to the unique axis. For a normal direction of polarization, light transmission obeys Snell's Law. The function of the $CdCr_2Se_4$ element is to rotate the direction of polarization, desirably by 90° so as to permit through-transmission or displaced transmission in the succeeding uniaxial elements. Polarized light is produced at source 31 and is focused through lens 32. The field necessary to bring about a $\pi$ rotation in the biased crystal, that is to retard or accelerate one polarization sense by 180°, is produced by the pole pieces 37 and 38 energized by D.C. source 31 applied to any of the desired crystal rotating elements 33 through 36 by means of switches 42 through 45, so completing the electrical circuit through associated leads 39 and 40.

Detection is accomplished at element 40. The precise position of a light spot produced by a beam leaving element 49 is dependent upon the presence or absence of field on each of the rotating elements 33 through 36. Operating digital light deflectors have utilized detectors responsive to 250,000 light positions per square inch.

It has been indicated that the invention is, in part, directed toward the use of chromium trichloride as an initial flux ingredient. While it is permissible to include other halides in the flux, the initial presence of chromium trichloride is essential. Cadmium chloride is more stable than chromium trichloride, so that little, if any, of the latter material is formed in this manner. It is convenient to initially include cadmium in the form of the selenide, CdSe, and the example is based on use of such ingredients. It is apparent, however, that use of these initial materials results in a selenium deficiency, thereby limiting the maximum yield of $CdCr_2Se_4$. The example depends upon use of a sealed chamber to exclude harmful ingredients such as oxygen, water, and nitrogen, which result in undesired reactions. Other techniques for accomplishing this end include use of a protective atmosphere. Of course, use of chlorides containing harmful ingredients results in unwanted reactions so that oxychlorides and hydrated chlorides are undesirable.

*Example*

CdSe and $CrCl_3$ powders, in amounts of 1.5 grams and 1.0 gram, respectively, were pressed into individual pills 6 mm. in diameter. The pills were placed in contact with each other in a platinum boat which was then placed in a quartz tube which was evacuated to $5 \times 10^{-6}$ mm. of mercury and was then sealed. The sealed assembly was placed in a furnace, which was raised to a temperature of about 700° C. in a period of about four hours. It was observed that the entirety of the CdSe pill and a part of the $CrCl_3$ pill combined to form a molten interfacial region. After a period of three days, the tube was permitted to cool to room temperature, was broken open, and the contents removed. It was found that regular and elongated octahedra of $CdCr_2Se_4$ had grown out of the liquid interfacial material.

The relative amounts of starting ingredients may be varied. While prolonged study will no doubt reveal optimized ranges of such ingredients to maximize yield, the invention is premised solely upon the initial use of chromium trichloride in any amount sufficient to result in the desired end product.

The technique described in the example is largely dependent for growth upon the constant introduction of nutrient material to the flux. It is apparent that dropping-temperature techniques, so prevalent in other flux growth methods, may be used. Accordingly, the entire flux may be rendered molten, the temperature may then be dropped, for example at ½° C. per hour or more, and growth may be caused to proceed either through random nucleation or upon an inserted seed.

The exemplary period of three days has been proven satisfactory for the described growth technique. Generally, a period of at least one day is desired for sufficient growth. Periods of as great as a week have been used successfully.

The temperature of about 700° C. is considered a preferred maximum since $CdCr_2Se_4$ is known to decompose at higher temperatures. Lower temperatures may be used but result in slower reaction rates.

The invention has been described in terms of a limited number of embodiments. For example, variations of the devices depicted are possible. A functioning digital light deflector, such as that described in conjunction with FIG. 3, depends for its operation upon the induced birefringence brought about under the influence of an applied magnetic field. On the other hand, the modulator of FIG. 2 ignores this effect and depends for its operation upon true magnetic rotation of the plane polarized beam. It is this latter mode of operation which permits the greatest bandwidth and it is therefore generally to be preferred for communications use. Nevertheless, the two modes of operation may be interchanged, so that a modulator may be made to operate in the manner of an electro-optic device, that is, merely by inducing birefringence, and a light deflector may be made to operate by true rotation.

Devices have been described in terms of the material $CdCr_2Se_4$. It is clear that this normal composition may be varied through intentional or unintentional inclusions without departing from the inventive teachings. The ferro-magnetic behavior of the composition is, of course, dependent on the chromium ions. Partial replacement with nonmagnetic ions results in reduced magnetic saturation. Reduced saturation permits the use of smaller modulating fields and, if not accompanied by too severe a drop in Curie temperature, may result in a net gain. Impurities which change the valence state of any chromium present in either direction from its normal 3+ state are generally undesirable, as are other impurities which broaden resonance linewidth or increase absorption. Such undersirable impurities include ions which may occupy either the cadmium or the chromium site. Examples are nickel, cobalt, and silicon. Of course, what is of concern is the net number, rather than the total number, of any such ions, so that the presence of excessive 4+ or 2+ ions may often be compensated by 2+ or 4+ additions. To maintain the narrow linewidth to which the crystals of this invention owe their desirability, the materials should be pure. For this reason, it is preferred that total impurity content be kept below 1% by weight.

What is claimed is:

1. Process for forming the crystalline composition $CdCr_2Se_4$ characterized in that initial starting ingredients consisting essentially of CdSe and $CrCl_3$ are placed in physical contact with each other within a receptacle, the receptacle is evacuated, receptacle and contents are heated to form a molten interfacial region at the position of contact between the said starting ingredients, in that receptacle and contents are maintained at said temperature for a period of at least one day, and in that the receptacle and contents are subsequently cooled.

2. Process of claim 1 in which the said liquid region is caused to attain a temperature of about 700° C.

References Cited

Baltzer et al., "Physical Review Letters," vol. 15, 1965, pp. 493–495.

Lee, "Journal of Physical Chemistry," vol. 62, 1958, pp. 877–878.

Nitsche et al., "Journal of the Physics & Chemistry of Solids," vol. 21, 1961, pp. 199–205.

Schafer, "Chemical Transport Reactions," Academic Press, New York, 1964, pp. 116–129.

HERBERT T. CARTER, Primary Examiner

U.S. Cl. X.R.

23—50; 332—7.51